Inventor
Josef Holy

Patented Apr. 19, 1938

2,114,423

UNITED STATES PATENT OFFICE 2,114,423

COMBINATION PORTABLE SAW AND CHOPPER

Josef Holy, Onarga, Ill.

Application July 9, 1936, Serial No. 89,727

11 Claims. (Cl. 143—68)

This invention is directed to a portable sawing machine mounted upon a suitable vehicle, more specifically upon a frame similar to a truck frame, and preferably built as a part of a regular motor truck with the features of my herein described invention built in and mounted on the frame and beneath the usually mounted internally mounted combustion engine and without any inconvenience or interference of a normal motor truck. The present invention is directed to features which are equally adapted to be made a part of a conventional motor vehicle such as is used in the logging and lumbering industry, it being understood that the drawings and description herein make no detailed description or disclosure as to the well known features of an engine driven truck having conventional traction wheels, internal combustion engine, body, etc.

The present invention is particularly directed to an inexpensive device, construction and mechanism for operating the horizontal reciprocal saw mounted for slidable movement at the forward part of the vehicle frame and adapted to be selectively, either manually or by means driven from the vehicle engine, to shift a slidable frame or carriage forwardly or backwardly and to position a reciprocal saw blade mounted in a slidable frame against a tree to perform the felling operation as is usual in the logging and lumbering industry.

An important object of my invention is the provision of a movably mounted frame-like carriage, movable longitudinally with respect to the frame of a vehicle, such as a truck or other chassis having a suitable guide track thereon and a saw releasably and adjustably mounted in saw-holding means which means are mounted for reciprocating horizontal movement with respect to said carriage and guide track.

A further object of my invention is the provision of a power driven logging or tree felling saw providing a horizontally slidable power driven saw frame and saw thereon on the forward end of a vehicle, truck or chassis, the vehicle and attached sawing devices being adapted to be driven from one position to another and partly anchored adjacent a tree and in which position the reciprocating power driven saw may saw the tree to fell the same.

A further object of my invention is the provision of a device adapted to be built or attached to a part of conventional vehicle frame such as a truck or the like which provides a longitudinally slidable element and guide track thereon and a transversally or horizontally reciprocal saw, a shaft and gear mechanism driven by the vehicle engine adapted to reciprocate said saw either horizontally or at other angles with respect to the ground or tree to be felled, and to further provide means whereby the sawing element may be selectively detached and disconnected from the power driven reciprocating mechanism and a cross-cut or other single bladed saw be detachably secured in a position adjacent the front of the vehicle and to the power driven reciprocating mechanism.

A further object of my invention is the provision of a device adapted to be mounted upon and secured to a conventional frame of an engine driven vehicle, including shaft and gear mechanism connected to and driven from the vehicle engine and adapted to provide a saw reciprocating mechanism at the forward portion of the truck or similar vehicle, said saw reciprocating mechanism being mounted upon a frame or carriage movable longitudinally of said vehicle, having a transverse guide track in which a slidably mounted cross-cut saw may be rollably mounted, and having manually operable means for moving said carriage, gear mechanism and attached parts forwardly to the desired position with respect to the front end of the vehicle frame to thereby position the saw.

A further object of my invention is the provision, in combination with a portable frame having power driven mechanism adapted to reciprocate a slidably mounted saw, of a mechanism for selectively and intermittently chopping, splitting or cutting blocks of wood or the like, and having manually operable means to associate therewith for causing the same to be actuated when desired.

Other and further objects of my invention will be apparent from the following description and claims.

This invention (in a preferred form) is illustrated in the drawings and hereinafter more fully described.

On the drawings:

Fig. 2 is a partially side elevational view and partially cross sectional view of my device showing the relative position of the parts and showing but only the front portion of the chassis or vehicle frame.

Fig. 9 is a perspective view showing a modification of the form of adjustable bracket shown in Fig. 8 to provide for diagonal cutting.

Fig. 10 is a perspective view of the projecting bracket portion 22b with a conventional cross cut single unit saw blade of relatively large size pivotally mounted thereon for use in cross cutting felled logs, trunks, and the like.

The reference numeral 10 indicates a forward portion of the rectangular frame of a vehicle chassis, preferably that of a truck, and will be hereinafter referred to as "frame", although not shown in toto as to the entire vehicle. Said frame 10 is preferably composed of substantially parallel side trusses 10a and 10b of U-shaped cross section which are connected together by intermediate cross bars 10d and 10e, and other connecting bars near and at the rear of the vehicle frame which are not shown in the present drawings. Said frame 10 is mounted upon suitable forward and rear traction wheels which are rotatably mounted upon front and rear axles, the forward axle being indicated by reference numeral 11, having front traction wheels 12 and 12a mounted thereon and the forward portion of frame 10 being securely mounted upon a pair of conventional springs 13 and 13a which are clamped and mounted on the axle to provide a springable mounting for the chassis, frame and attached parts. Conventional means are provided for turning the front wheels by suitable pivotal knuckles of well known construction which are not shown in detail in the present drawings.

A relatively long shaft 14 is rotatably journalled in cross trusses or bars 10d and forward truss 10c in a position parallel to and substantially midway between the side trusses of frame 10. Securely mounted upon the rear end of shaft 14 is a suitable gear wheel of relatively small diameter which is in mesh with and driven by a suitable ring gear (not shown) which in turn is securely mounted upon the rotatable drive shaft of the vehicle or truck driving mechanism which extends rearwardly from the conventional gear transmission housing toward and to drive the rear axle of the vehicle. It will be apparent that with this gear in mesh the shaft 14 will be constantly rotated when the vehicle engine is running.

It is to be noted that all the parts of my hereinbefore and hereinafter described invention, so far as it pertains to the reciprocating saw, is so mounted that it will normally be both between and immediately above and adjacent the forward end of the vehicle frame and in such a position that it will permit the internal combustion motor comprising the power source to be mounted in its substantially normal position slightly above the vehicle frame in a manner similar to certain modern trucks, and that there will be no interference in such assembly due to the embodiment of my invention.

I also desire that it be understood that the herein described invention may be built into and mounted upon the rear end of a conventional truck chassis, in which case the truck would be backed up to position the reciprocal saw adjacent a tree to be sawn, or that this invention may similarly and satisfactorily be mounted upon a separate frame which may be either suitably secured to a conventional truck frame and chassis or be mounted upon individual traction wheels and suitably connected to the truck chassis to permit satisfactory connection to the power driven drive shaft or power take-off pulley secured on the rear vehicle wheel.

Said shaft 14 has formed on its forward end spiral threads 14a and has also formed upon a section thereof substantially between cross trusses 10d and 10e external spiral threading 14b. A pair of relatively narrow channel-like guide members 15 and 15a are secured in parallel position upon the upper surface of the opposite side trusses 10a and 10b of frame 10 respectively and so that their openings face the center of the vehicle. These guide members 15 and 15a, while shown as mounted upon the uppermost surface of the side trusses 10a and 10b respectively, may be also for convenience mounted upon the inside surface of said trusses with like effect and result. A rectangular frame or carriage 16 is slidably mounted for longitudinal movement in and between said opposite guide members 15 and 15a. As clearly shown in the cross sectional view of Fig. 2, right-angled brackets 17 and 17a are secured respectively to opposite adjacent ends to the rear cross bar of carriage 16 and provide means for anchoring one end of each of the pair of eyelet bolts 17b, said eyelet bolts being adapted to secure one end of each of two yieldable coil springs hereinafter described.

Securely mounted upon and above the forward cross member of carriage 16 is a hollow metal guide track 18 of rectangular cross section, except having a longitudinal extending slot opening forwardly with respect to the vehicle, said guide track 18 extending from a point above one side truss 10a to above the other side truss 10b and perpendicular thereto.

Figure 1:
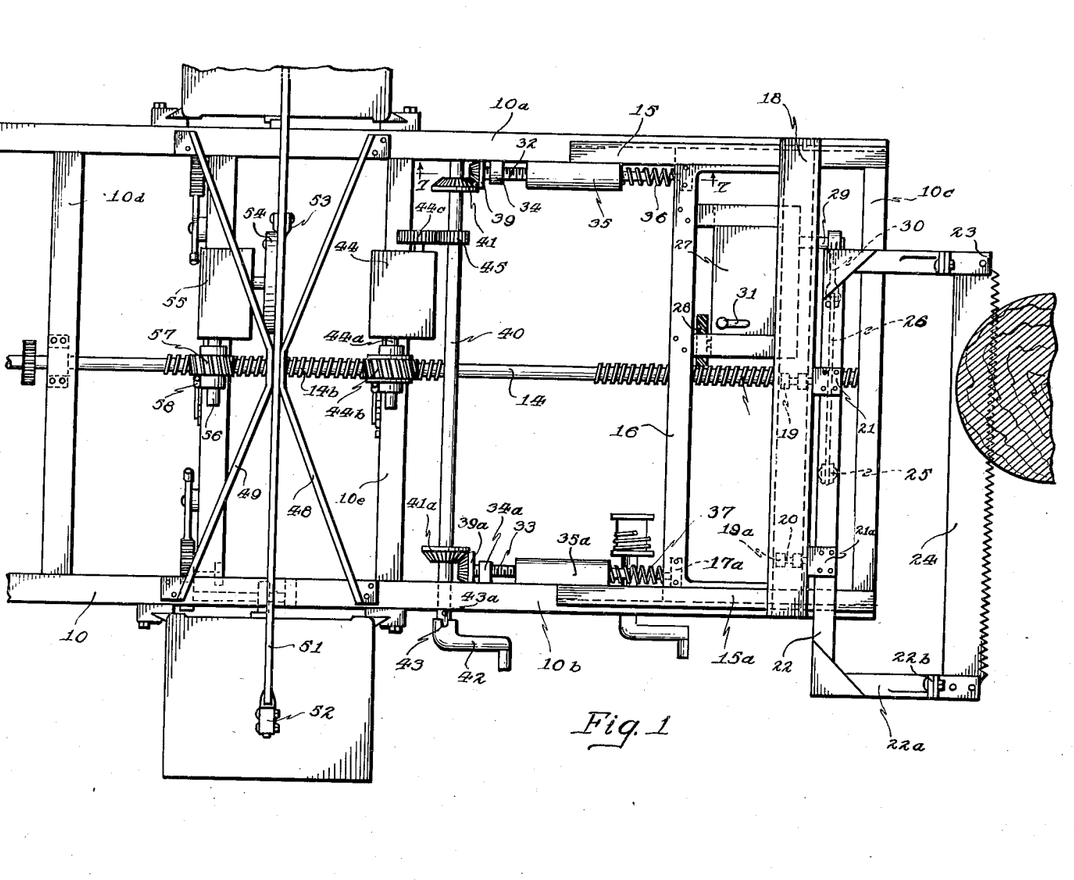
Fig. 1 is a top plan view of my device showing those parts and mechanism which comprise my invention showing only the front portion of a vehicle frame.
Figures 2, 9, 10:
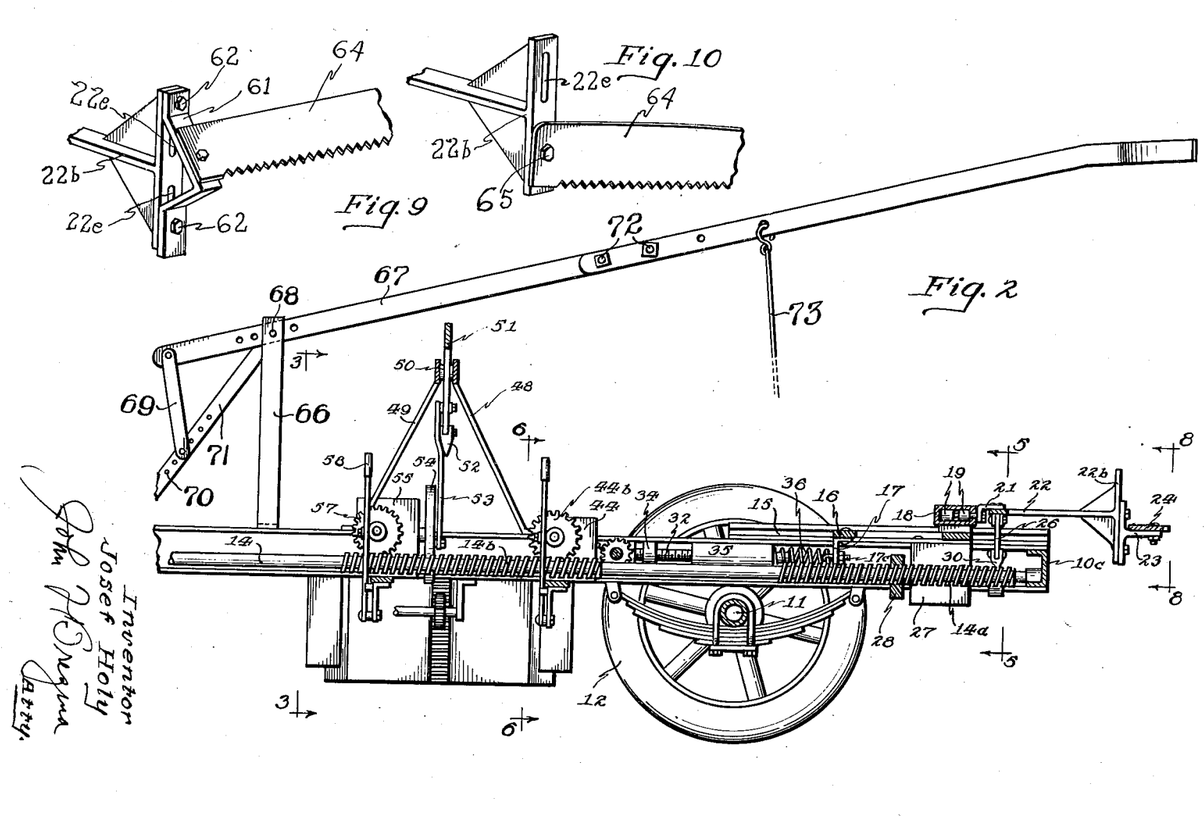

A pair of rollers indicated by reference numeral 19, as shown in Fig. 2, and a second pair of like rollers 19a, as shown in Fig. 1, are respectively rotatably mounted on spaced apart stub shafts 20 (one of which is shown in Fig. 2), the forward ends of said stub shafts extending through and projecting from the slotted opening of guide track 18, upon which projecting ends respectively are mounted angular brackets 21 and 21a.

Figure 8:
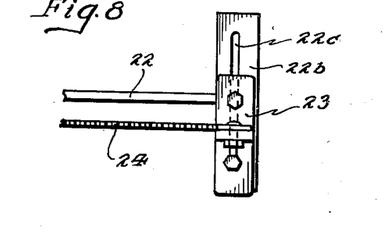
Fig. 8 is an enlarged fragmentary and elevational view of one end of the reciprocal saw frame.

The U-shaped section 22a of a rectangular saw frame indicated by reference numeral 22 is secured by suitable rivets (as indicated in Fig. 1) to brackets 21 and 21a respectively and in such a position so that the longitudinal edge of said saw frame section 22a will be parallel to and adjacent to said guide track, it being readily apparent that said saw frame will ride in a horizontal plane and be retained in proper position due to the fact that the rollers 19 and 19a fit snugly within guide track 18. As clearly shown in Figs. 2 and 8, each of the forward ends of the saw frame section 22a comprise two separate T-shaped sections 22b which present front forward vertical surfaces and each of which has a substantially central vertically extending slot 22c, as clearly shown in Fig. 8. A pair of right-angled brackets are releasably mounted for slidable movement along the forward faces 22d, said brackets each having a central aperture and being releasably mounted by a bolt or the like which passes through the slot 22c of the frame portion 22b to provide for variable vertical adjustment of said brackets and of the saw or saw blade secured thereon. Reference numeral 24 indicates a saw blade which may be of any conventional construction and which has its opposite ends respectively bolted to the horizontally extending portion of bracket 23.

Formed on the section 22a of saw frame 22 is an apertured ear 25 formed integrally with said frame section, to which one end of a metal connecting link 26 is pivotally secured, said link being moved and reciprocated in a manner which will be more fully described hereinafter.

Figure 5:
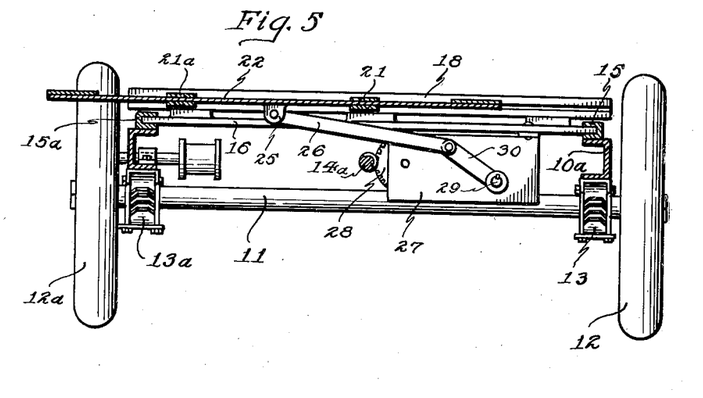
Fig. 5 is an elevational view showing certain parts in cross section taken from the front of the vehicle and showing the relative position of the slidable carriage and reciprocal saw.

Referring to Figs. 1, 2, and 5, reference numeral 27 indicates a housing which is suitably secured by rivets or the like at the corners thereof, as shown in Fig. 5, to the underside of the slidable carriage 16. Contained within the housing 27 is a plurality of gears which are suitably rotatably mounted therein in such a manner to constitute a speed reducer. The said speed reducer is driven from a rotatably mounted external spirally threaded gear 28 which is normally in mesh with and driven by the external spiral threads of rotatable drive shaft 14. The slower rotative movement produced by said speed reducer drives a forwardly extending shaft 29 which is suitably journalled in said speed reducer. Mounted on the forward projecting end of said shaft 29 is an arm 30, which is adapted to be rotated as described, and which has its free end pivoted to one end of connecting link 26. It will be apparent that rotation of said drive shaft 14 will transmit the movement to rotate arm 30 to move and reciprocate link 26 and saw frame 22, which frame will ride back and forth in the guide track 18.

Reference numeral 31 indicates the upper projecting end of a lever which is adapted to operate a throw-out clutch of conventional construction (not shown) and contained within the speed reducer. A suitable arm or lever (not shown) may be pivoted to actuate clutch lever 31 from a remote point at any convenient location upon the vehicle or frame.

Figure 7:
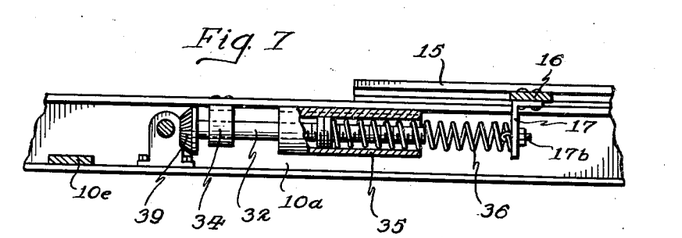
Fig. 7 is an enlarged fragmentary side elevational view taken on line 7—7 of Fig. 1.

To provide for selective manual or automatic slidable movement of the slidable carriage 16, attached parts and slidable frame as the sawing progresses through the object being sawn, I provide a pair of externally threaded screws 32 and 33 which are mounted respectively for rotation in threaded members 34 and 34a which are secured on and project from the side trusses 10a and 10b of frame 10. The forward end of each of the said screws 32 and 33 are within cylindrical housings 35 and 35a respectively, which housings are suitably attached to the frame side trusses. The extreme forward ends of said screws 32 and 33 are reduced to form a reduced portion which are secured respectively to the ends of compressible coil springs 36 and 37, as clearly shown in Figs. 1, 2, and 7. The forward ends of said springs 36 and 37 are attached to the slidable carriage 16 by means of suitable eyelet bolts 38.

The rearmost ends of the screws 32 and 33 have secured thereon respectively bevelled gears 39 and 39a. A transversely extending shaft 40 having its opposite ends suitably journalled in the side frame trusses 10a and 10b respectively, have secured thereon suitable bevelled gear wheels 41 and 41a which mesh with bevelled gears 39 and 39a. One end of shaft 40 projects horizontally from frame truss 10b and provides for convenient mounting of a hand crank 42, said crank being slidably mounted on the end of said shaft 40 and having a suitable annular recess 43 adapted to engage a stud 43a secured on the end of said shaft 40 so as to allow the shaft 40 to be rotated by power driven means hereinafter described without rotation of crank 42. It will be apparent that the rotation of shaft 40 in clockwise direction will advance screws 32 and 33 forwardly to in turn slide the carriage forwardly, and reverse sliding movement of carriage 16 and attached parts, including the saw, is accomplished by counter-clockwise rotation of shaft 40.

In the illustration of the drawings, I have provided a power take-off mechanism from the rotatable drive shaft 14 to rotate the shaft 40 to in turn move the carriage 16, attached parts and saw forwardly, this mechanism being, however, dispensable and optional, as the desired and satisfactory movement of the saw may be effected through the means of manual rotation of the shaft 40. This power take-off mechanism comprises a speed reducer 44, shown schematically in Figs. 1 and 6, which has one projecting rotatable splined shaft 44a on which is slidably mounted a gear wheel 44b, said gear wheel 44b, when in driving position, meshing with and being driven by the section of external spiral threading 14b of drive shaft 14. Rotative movement is thereby transmitted from said drive shaft 14 through gear wheel 44b, through a second external gear wheel 44c of said speed reducer 44, said gear wheel 44c meshing with the gear 45 secured on rotatable shaft 40, whereby said rotative movement is transmitted to rotate said shaft 40 and consequently advance the saw in a forward direction.

Figure 6:
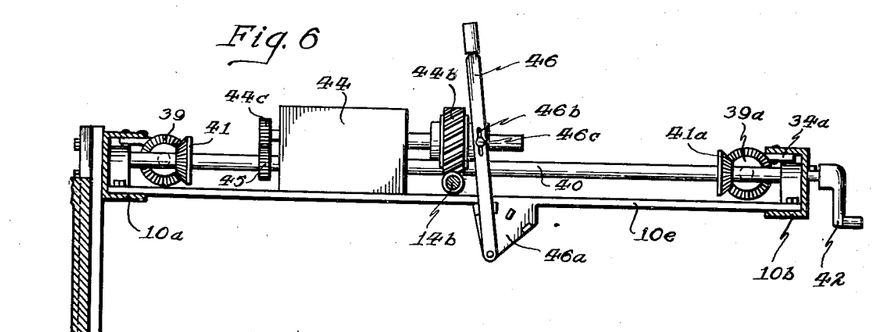
Fig. 6 is a fragmentary and partially cross sectional view and partially elevational view taken on line 6—6 of Fig. 3.

As clearly shown in Fig. 6, I provide manually operable means for sliding gear wheel 44b in and out of mesh with drive shaft 14, this means comprising a lever 46 having its lower end pivoted upon a suitable mounting plate 46a and having a longitudinally extending central slot 46b, said lever 46 being attached to the shank of gear wheel 44b by means of a suitable bolt 46c which slides in said slot 46b when the gear wheel 44b is disengaged or engaged.

A further important feature of my invention is the provision, in combination with a vehicle frame, preferably as a part of the same unit with the invention thus far described in the specification, of a mechanism for splitting or chopping blocks of wood which may be readily placed upon a suitably pivoted vertically adjustable bracket, either on one or both sides of my machine. I desire that it be understood that while the particular construction shown in the drawings illustrates a compound unit wherein the splitting and cutting elements are pivoted on both sides of the machine, my invention and claims contemplate the use of but one such pivotally mounted power driven splitting and cutting element.

Figures 3, 4:
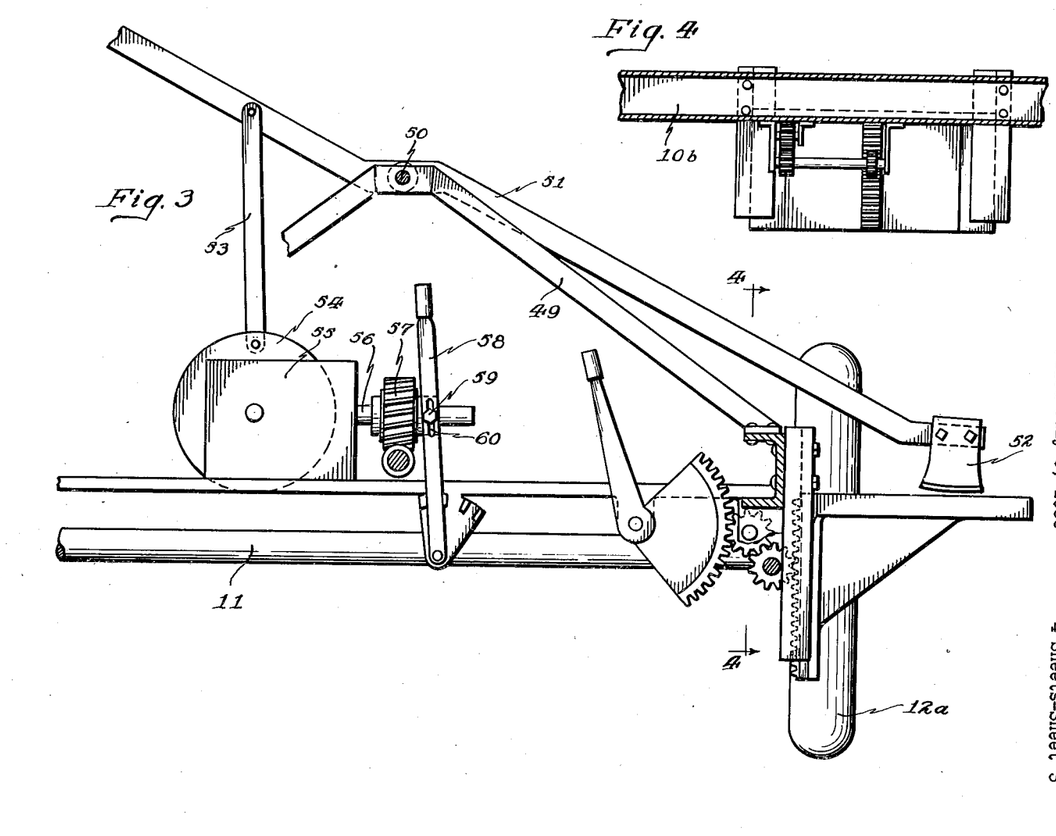
Fig. 3 is an enlarged fragmentary and partially cross sectional view taken on the line 3—3 of Fig. 2 and illustrating particularly the mechanism and that portion of my invention representing the chopping, splitting and cutting of my device.
Fig. 4 is a fragmentary cross-sectional view taken on line 4—4 of Fig. 3.

As illustrated in Figs. 1 and 4, a pair of arch-shaped brace members indicated by reference numerals 48 and 49 respectively, are mounted transversely of the frame 10 and so that their opposite lower ends rest upon and are secured to the said trusses 10a and 10b of frame 10, the said brace members being secured in such a position that the intermediate portions thereof will be spaced apart only a short distance. A suitable stub shaft 50 passes through and connects the intermediate portions of brace members 48 and 49 and acts as a fulcrum on which is mounted for pivotal and rocking movement a relatively long cross bar 51, which is of a length so that each end thereof projects a short distance beyond the side trusses of the frame. An ax head 52 is securely mounted on each outer and free end of cross bar 51 in a position so that the blade thereof will be substantially horizontal.

The mechanism for selectively actuating or rocking said cross bar 51 in either direction comprises a connecting link 53, one end of which is pivoted to said cross bar 51 at a point a short distance from the above shaft 50 and the lower end of which is pivotally and removably connected to a rotatably mounted wheel 54, said wheel 54 being in turn mounted upon one end of an axle forming a part of a gear mechanism indicated by reference numeral 55. Gear mechanism 55 is illustrated only schematically by a box, and internally is of a conventional construction, being driven from a rotatably mounted shaft 56, a portion of which shaft projects from the gear mechanism housing, as clearly shown in Figs. 1 and 4. Said projecting end of rotatable axle 56 is preferably splined and has mounted thereon for slidable movement a slidable gear wheel 57, the gear teeth of which are in mesh with the section of external spiral threads 14b of drive shaft 14. So that this mechanism and cross bar 51 and ax head 52 may be elevated and lowered selectively, I provide convenient means for shifting said gear wheel 57 to disengage it from drive shaft 14, which means comprises a lever 58 pivoted at its lower end, as indicated in Fig. 3, and slidably connected to the shank of gear wheel 57 by means of a bolt 59, said bolt 59 being adapted to slide in a central slot 60 of said lever 58. It is to be understood that said lever 58 may assume different forms, lengths and shapes or be connected to other movable elements whereby the said lever and said mechanism may be disengaged by an operator from a point at the side of the frame and remote from the described position of said mechanism.

Referring to the modified forms of Figs. 9 and 10, with parts broken away, which comprise the forward T-shaped bracket 22b, having forwardly facing vertical surfaces and slots 22e therein in substantial vertical alignment. This T-shaped bracket is of a construction identical to the T-shaped sections 22b described with reference to the first form illustrated in the specification, except that in this instance, there are two relatively shorter slots 22e as indicated instead of one in the first described structure. A substantially triangular bracket 61 having its opposed ends suitably apertured as indicated is adapted to be removably mounted on the front bracket 22b permitting vertical adjustment by bolts 62 which when loosened will slide to desired position in the slots 22e. Bracket 61 presents a diagonal upper face which has a suitable aperture and on which one end of a relatively heavy saw blade 64, such as used in logging and cross cutting, is adapted to be pivotally mounted by means of bolt 65, the pivotal engagement permitting the saw to continue in its downward cut by gravity.

The illustration of Fig. 10 shows the front frame section or T-shaped section 22b with the vertical face forwardly and the saw blade 64 pivotally mounted directly thereon by means of the bolt 65 which passes through one of the slots 22e and which may be suitably bushed therein. The pivotal movement of the saw blade 64 as indicated in Fig. 10, permits maintenance thereof in a vertical frame to provide for cross cutting of felled logs, trunks and the like, it being an important object of the invention to permit the vehicle or chassis upon which the aforedescribed mechanism is mounted to be driven successively and to the desired position alongside a log or tree and the blade 64 mounted as indicated in Fig. 10 to make cross cuts in a position perpendicular to the longitudinal center of the vehicle chassis and parallel to the movement of the carriage 22. In this form it will also be apparent that gravity and the weight of the saw 64 will cause it to continue downwardly through the cut.

A short description of the brace lever and cooperating parts is as follows. Referring to Fig. 2, numeral 66 indicates a metal standard or post which has its lower end fixedly secured to the longitudinal members of the portable frame which comprise the chassis. A relatively long rigid brace 67, which is bifurcated at one end and which has a plurality of apertures a short distance from its other end, is fulcrumed or pivotally mounted on base 66, as indicated in Fig. 2. The shorter end of said lever is pivoted by suitable pivot 68 for rocking movement on standard or post 66, and said shorter end also has a short connecting link 69 pivoted thereto, which is releasably and adjustably bolted at its lower end to any one of a number of spaced apart apertures 70 formed in a diagonal brace 71, said brace 71 bracing post 66.

The brace 67 is made in two parts, as clearly shown in the drawings, which parts are overlapped and held together by bolts 72, this providing for making the brace 66 shorter or longer to meet the particular requirements. In operation, the bifurcated or bent end of brace 66 is placed against the trunk of the tree which is proposed to be felled, and the brace held down as for example by cable 73 and the brace thereby firmly held and gradually lowered against the trunk as the tree gradually tips.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In combination with a frame mounted for portable movement, a slidably mounted frame-like carriage adapted to move longitudinally of said frame; means for selectively moving said carriage backward or forward in said frame comprising a crank arm, a transverse shaft, a pair of screws journalled along the sides of said frame, and cooperating bevel gears on said transverse shaft and said screws respectively, yieldable springs between the ends of said screws and said carriage and connecting the same together; manually actuable mechanism for connecting said transverse shaft and a power source to permit power-impelled backward and forward movement of said carriage; a substantially enclosed guide track mounted transversely on said carriage; a horizontally and slidably mounted saw frame; roller elements connected to said saw frame and adapted to ride in said guide track, said saw frame being thereby supported in a horizontal plane; a rotatably mounted drive shaft journalled on said first mentioned portable frame; power transmission gear mechanism driven by said shaft and secured to said carriage; a rotatable crank arm connected to and rotatable by said gear mechanism and a pivotal connecting link connecting the free end of said arm and said saw frame, the rotation of said arm being adapted to impart reciprocating horizontal movement of said saw frame.

2. In combination, a frame mounted for portable movement, a slidably mounted frame-like carriage adapted to move longitudinally of said frame; manually operable means for selectively moving said carriage backward or forward in said frame; a guide track mounted transversely on said carriage and comprising a forwardly opening channel-like member; a horizontally and slidably mounted saw frame; said saw frame comprising a main U-shaped section and a pair of angular brackets mounted on the forward ends respectively of said U-shaped section, said brackets being adjustable vertically and providing means to mount the saw blade thereon; roller elements connected to said saw frame and adapted to ride in said guide track, said saw frame being thereby supported in a substantially horizontal plane; a rotatably mounted shaft journalled on said first mentioned portable frame; a longitudinally extending power driven shaft journalled in said first mentioned frame; power transmission gear reduction mechanism driven by said shaft and secured to said carriage; lever means connected to and movable by said gear reduction mechanism; said lever means including a pivotal connecting link connecting the same and said saw frame, the rotation of said gear mechanism being adapted to impart reciprocating horizontal movement of said saw frame and manually operable mechanism adapted to be driven from said power driven shaft and for selectively and automatically moving forwardly or backwardly said movable carriage and attached parts.

3. In combination, a frame mounted for portable movement, a slidably mounted frame-like carriage adapted to move longitudinally of said frame; manually operable mechanism for selectively moving said carriage backward or forward in said frame; means for selectively engaging or disengaging said mechanism to cause the same to be power-driven to move said carriage forwardly or rearwardly, a guide track mounted transversely on said carriage; a horizontally and slidably mounted saw frame; said saw frame comprising a main U-shaped section and a pair of angular brackets mounted on the forward ends respectively of said U-shaped section, said brackets being adjustable vertically and providing means to mount the saw blade thereon; roller elements connected to said saw frame and adapted to ride in said guide track, said saw frame being thereby supported in a horizontal plane; a rotatably mounted shaft journalled on said first mentioned portable frame; power transmission gear mechanism driven by said shaft and secured to said carriage; lever means connected to and movable by said gear mechanism; said lever means including a pivotal connecting link connecting the same and said saw frame, the rotation of said gear mechanism being adapted to impart reciprocating horizontal movement of said saw frame; and gear reduction mechanism gearingly connected to said carriage moving means and to said rotatably mounted shaft and adapted to be driven thereby.

4. In combination, a vehicle frame mounted for portable movement, a slidably mounted frame-like carriage adapted to move longitudinally of said frame; means for selectively moving said carriage backward or forward in said frame; a guide track mounted transversely on said carriage; a horizontally and slidably mounted saw frame; roller elements rotatably connected to said saw frame and adapted to ride in said guide track, said saw frame being thereby supported in a substantially horizontal plane; a rotatably mounted shaft journalled on said first mentioned portable frame; means driven from the vehicle power source for driving said shaft; power transmission gear mechanism driven by said shaft and secured to said carriage; rotatable and reciprocable levers means connected to and movable by said gear mechanism, the rotation of said arm being adapted to impart reciprocating horizontal movement of said saw frame, and saw supporting means releasably connected to said saw frame for adjusting the vertical height thereof; a vertically extending post secured to said vehicle frame; and a lever acting as a brace fulcrumed intermediate its ends a short distance from one end thereof on said post and in a position to project to a point substantially above said reciprocable saw frame, said lever having a plurality of apertures therein whereby the same may be pivoted to vary the length of the longer projecting portion thereof.

5. In combination with a frame mounted for portable movement, a slidably mounted frame-like carriage adapted to move longitudinally of said frame; means for selectively moving said carriage backward or forward in said frame; a substantially enclosed guide track mounted transversely on said carriage; a horizontally and slidably mounted saw frame; roller elements connected to said saw frame and adapted to ride in said guide track, said saw frame being thereby supported in a horizontal plane; a rotatably mounted drive shaft journalled on said first mentioned portable frame; power transmission gear mechanism driven by said shaft and secured to said carriage; a rotatable crank arm connected to and rotatable by said gear mechanism; a pivotal connecting link connecting the free end of said arm and said saw frame, the rotation of said arm being adapted to impart reciprocating horizontal movement of said saw frame; a vertically extending post secured to said vehicle frame; and a lever acting as a brace fulcrumed intermediate its ends a short distance from one end thereof on said post and in a position to project to a point substantially above said reciprocable saw frame and for bracing against an object to be sawed, said lever having a plurality of apertures therein whereby the same may be pivoted to vary the length of the longer projecting portion thereof.

6. In combination with a portable vehicle frame including longitudinal extending side trusses and transverse cross bars, a driven shaft extending longitudinally of said frame and journalled in said cross bars, said shaft having spiral threads thereon; a gear connection on said shaft adapted to be connected to a power driven driving source; a slidably mounted carriage mounted to move parallel to said frame side trusses; means for guiding the forward and rearward longitudinal movement of said frame; manually actuable means for selectively moving said carriage backward and forward; a gear transmission speed reducer mounted on threaded portion of said driven shaft and including a slidably mounted gear wheel in mesh with the threads of said driven shaft; manually operable lever means for selectively engaging and disengaging said gear wheel from said shaft, said speed reducer mechanism including a second driven gear wheel; gear mechanism connecting said second driven gear wheel and said manually actuable means for moving said carriage to cause movement of said carriage; a guide track mounted transversally of said vehicle frame and across the front thereof; a movable saw frame slidably mounted for reciprocating movement with respect to said frame; roller elements connecting said saw frame and said guide track permitting reciprocating movement of said frame; a rotatably mounted arm driven through said speed reducer; a pivotal connecting link between said arm and said saw frame; and a speed reduction gear mechanism connected to and driven by said driven shaft and adapted to rotate said arm and reciprocate said saw frame.

7. In a portable power driven saw, a vehicle including traction wheels and a substantially rectangular frame mounted thereon, said frame including substantially parallel U-shaped side trusses and a plurality of cross bars connecting the same together; a driven shaft rotatably mounted and journalled in the front and rearward cross bars respectively; means on said shaft whereby the same may be selectively and gearingly connected to and driven by the universal shaft of the motor driven vehicle, said driven shaft having spiral threading therealong; a substantially rectangular carriage slidably mounted for longitudinal movement substantially between said frame side trusses and longitudinal of said frame adjacent the front portion thereof; a tubular guide track secured to and mounted on said carriage in a position substantially perpendicularly to said frame side trusses; a pair of spaced apart roller caster members adapted to ride in said guide track, each of said caster members having a projecting flat mounting portion; a rectangular saw frame having its back edge secured to the flat projecting portions of said caster members; the opposite end members of said saw frame each comprising a T shaped member and a right angled bracket releasably and adjustably mounted on said T shaped member; a saw blade being releasably secured on said annular brackets respectively, said brackets being adjustable vertically; a speed reducing gear mechanism secured on said carriage, one of the gears whereof is in mesh and driven by the spirally threaded forward end of said driven shaft; a rotating arm driven by said speed reducer; and a connecting rod pivotally connecting the free end of said arm and said reciprocating saw frame to impart backward and forward movement to said saw frame.

8. In combination with a chassis mounted for portable movement and having traction wheels, a slidably mounted carriage movable longitudinally in said frame; means providing anti-friction movement of said carriage; manually operable means for selectively moving said carriage longitudinally of said chassis; a horizontally and rollably mounted saw mounting frame mounted on said longitudinally movable carriage and to slide transversely and perpendicularly with respect to the longitudinal movement of said carriage; roller means connected to said slidable saw frame and engaging said carriage to maintain said saw mounting frame in proper position; power driven mechanism on said chassis; power transmission mechanism connecting said power driving mechanism and said slidable saw frame to reciprocate the latter; said saw frame terminating in a forwardly extending mounting bracket; said bracket being adjustable in vertical or inclined planes to adjust the height and position thereof, and a reciprocal saw having one end pivoted on said forwardly extending bracket of said reciprocable carriage and adapted to normally cut corresponding to the movement of said carriage.

9. In combination with a chassis mounted for portable movement and having traction wheels, a slidably mounted carriage movable longitudinally in said frame; means providing anti-friction movement of said carriage; manually operable means for selectively moving said carriage longitudinally of said chassis; a horizontally and rollably mounted saw mounting frame mounted on said longitudinally movable carriage and to slide transversely and perpendicularly with respect to the longitudinal movement of said carriage; roller means connected to said slidable saw frame and engaging said carriage to maintain said saw mounting frame in proper position; power driven mechanism on said chassis; power transmission mechanism connecting said power driving mechanism and said slidable saw frame to reciprocate the latter; an angular mounting bracket removably secured on said forwardly extending bracket of said saw frame, said mounting bracket presenting an inclined forward face; and a saw blade having one end pivoted on said inclined face of said saw blade being adapted to reciprocate in a common direction with said slidable saw frame and to cut in an inclined non-perpendicular direction.

10. In combination with a frame mounted for portable movement, a slidably mounted frame-like carriage adapted to move longitudinally of said frame; means for selectively moving said carriage backward or forward in said frame; a substantially enclosed guide track mounted transversely on said carriage; a horizontally and slidably mounted saw frame; roller elements connected to said saw frame and adapted to ride in said guide track; a rotatably mounted drive shaft journalled on said first mentioned portable frame; power transmission gear mechanism driven by said shaft and secured to said carriage; a driven rotatable pivotal connecting link connecting the free end of said arm and said saw frame, the movement of said link being adapted to impart reciprocating horizontal movement of said saw frame; a plurality of standards secured on said portable frame and extending upwardly therefrom; a stub shaft mounted horizontally on said standards; a relatively long lever pivoted and fulcrumed on said pivot and adapted to rock thereon and being adapted to be braced against an object to be sawn, and means for fastening said lever in desired position.

11. In combination with a frame mounted for portable movement, a slidably mounted frame-like carriage adapted to move longitudinally of said frame; means for selectively moving said carriage backward or forward in said frame; a substantially enclosed guide track mounted transversely on said carriage; a horizontally and slidably mounted saw frame; roller elements connected to said saw frame and adapted to ride in said guide track, said saw frame being thereby supported in a horizontal plane; a rotatably mounted drive shaft journalled on said first mentioned portable frame; power transmission gear mechanism driven by said shaft and secured to said carriage; a rotatable crank arm connected to and rotatable by said gear mechanism and a pivotal connecting link connecting the free end of said arm and said saw frame, the rotation of said arm being adapted to impart reciprocating horizontal movement of said saw frame; a bracing lever composed of two sections and mounted on said vehicle frame, said sections being adjustably connected together; a pivot passing through said bracing lever and means for releasably holding said lever in desired position.

JOSEF HOLY.